(12) United States Patent
Böhm et al.

(10) Patent No.: US 8,109,848 B2
(45) Date of Patent: Feb. 7, 2012

(54) PIVOTAL CONNECTION OF A BICYCLE DERAILLEUR

(75) Inventors: Robert Böhm, Mainberg (DE); Thorsten Hamisch, Würzberg (DE); Andreas Benz, Mainberg (DE)

(73) Assignee: SRAM Deutschland GmbH, Schweinfurt (DE)

( * ) Notice: Subject to any disclaimer, the term of this patent is extended or adjusted under 35 U.S.C. 154(b) by 325 days.

(21) Appl. No.: 11/458,440

(22) Filed: Jul. 19, 2006

(65) Prior Publication Data

US 2007/0021247 A1  Jan. 25, 2007

(30) Foreign Application Priority Data

Jul. 22, 2005  (DE) .......................... 10 2005 034 330

(51) Int. Cl.
*F16H 59/00* (2006.01)

(52) U.S. Cl. ................ 474/82; 474/19; 474/70; 474/80; 474/117; 474/133; 60/244; 60/257; 60/262; 60/263; 403/119; 403/146; 403/154; 403/404

(58) Field of Classification Search .................... 474/78, 474/80, 82; 403/146, 410; 280/436
See application file for complete search history.

(56) References Cited

U.S. PATENT DOCUMENTS

| | | | |
|---|---|---|---|
| 2,566,872 A | 9/1951 | Bernhardt | |
| 2,716,033 A | 8/1955 | Dodge | |
| 2,838,331 A | 6/1958 | Coleman | |
| 4,675,940 A * | 6/1987 | Brockhaus | 16/273 |
| 5,720,082 A * | 2/1998 | Rossmo | 16/244 |
| 5,884,365 A * | 3/1999 | Kluting | 16/257 |
| 6,203,459 B1 * | 3/2001 | Calendrille, Jr. | 474/82 |
| 6,290,621 B1 * | 9/2001 | Ichida | 474/80 |
| 6,682,252 B2 * | 1/2004 | Battey et al. | 403/84 |
| 6,837,815 B2 * | 1/2005 | Meggiolan | 474/82 |
| 2004/0014541 A1 * | 1/2004 | Dal Pra | 474/70 |
| 2006/0035737 A1 * | 2/2006 | Nankou | 474/80 |

FOREIGN PATENT DOCUMENTS

| | | |
|---|---|---|
| DE | 76 03 439 U | 9/1976 |
| DE | 35 18 798 A1 | 11/1985 |
| DE | 40 10 466 A1 | 10/1991 |
| DE | 44 11 084 A1 | 10/1994 |
| DE | 44 11 085 A1 | 10/1994 |
| DE | 197 28 641 A1 | 1/1998 |
| DE | 101 57 213 A1 | 6/2002 |
| EP | 1 010 613 A1 | 6/2000 |
| EP | 1 099 620 A2 | 5/2001 |
| EP | 1 357 023 A1 | 10/2003 |
| EP | 1 447 317 A2 | 8/2004 |
| GB | 988 439 | 4/1965 |
| GB | 21 46 698 A | 4/1985 |
| WO | WO 94/27008 A2 | 11/1994 |

* cited by examiner

*Primary Examiner* — Robert Siconolfi
*Assistant Examiner* — San Aung
(74) *Attorney, Agent, or Firm* — Milan Milosevic; Lisa Serdynski; Steven Courtright

(57) ABSTRACT

A stable and play-free pivot connection of a bicycle derailleur between a parallelogram link and either a base member or a chain cage. The pivot points are formed with first and second bushings that are arranged as far from one another as possible. The parts are connected by pivot pins having a anti-rotation contour for preventing rotation of the pin within an inner pivot part. The axial displacement of the pivot pin is prevented by a securing element or by a deforming element engaging a holding contour on the pivot pin. One of the first and second bushings is protected and arranged in a blind hole and the other of the first and second bushings is covered on the outside by a pin head of the pivot pin.

9 Claims, 4 Drawing Sheets

PIVOTAL CONNECTION OF A BICYCLE DERAILLEUR

BACKGROUND OF THE INVENTION

The present invention relates to pivotal connections of a bicycle derailleur between a parallelogram and either a base member connected to a bicycle frame or a chain cage for guiding a bicycle chain.

DE 101 57 213 A1 discloses a bicycle rear derailleur with a pin-mounted parallelogram. Links of the parallelogram are connected to a base member and to a chain cage by inserting pivot pins into aligned bores of one of the links and one of the base member and the chain cage. To prevent the pivot pins from axially displacing, a securing ring is snapped into a groove on the pivot pin. In one embodiment, the securing ring is axially supported on the parallelogram link and on the base member or the chain cage. In another embodiment, the securing ring is arranged in a recess in the parallelogram link that is laterally supported in a recess in the base member or the chain cage.

One drawback of the above pivot connection between the parallelogram link and the base member or the chain cage is that it does not have any defined bearing surfaces, resulting in the pivot pin rotating in the base member or the chain cage as well as in the parallelogram link. Further, there is no covering over either end of the pivot pin, such that dirt is not prevented from entering between the pin and the mounting bore.

SUMMARY OF THE INVENTION

The present invention provides a bicycle derailleur having a pivotal connection including a defined bearing surface and a maximum distance between the bearings. In addition, the bearing is protected from dirt and the pivot pin is attached so as to protect it from loss. The bicycle derailleur may be a front or rear derailleur.

The bicycle derailleur generally includes a base member, a chain cage and a parallelogram pivotally connected at one end to the base member and at other end to the chain cage by pivot pins. Generally, the pivotal connection is between an inner pivot part and an outer pivot part. The inner pivot part may be the parallelogram or one of the base member and the chain cage and the outer pivot part may be the parallelogram or one of the base member and the chain cage. In the present invention, the pivotal connection includes first and second bushings that are precisely defined and disposed as far outwards as possible. For this purpose, one of the two pivot parts is guided in the area of the bushing by the other pivot part. For this invention, it is irrelevant whether the base member or the parallelogram is disposed on the outside on the pivot and surrounds the other part on two sides. The pivot pin further includes a anti-rotation contour to prevent it from rotating in the inner pivot part. The anti-rotation contour may include toothing, a knurl or the like.

In one embodiment of the present invention, the pivot connection may also include a securing element to prevent axial displacement of the pivot pin. The securing element may also define the distance between the inner and outer pivot parts and prevent against loss of the pivot pin. The securing element engages a holding contour, in this embodiment a groove or bore in the pivot pin. The securing element may be a securing ring, snap ring, splint, securing disc or the like. In order to fix the position of the pivot parts, on the one side, the pin head contacts the outer pivot part and, on the other side, the securing element engages the holding contour, preferably a circumferential groove on the pivot pin, and is supported on the inner pivot part. The securing element is disposed between the mounting points, in the vicinity of the inner pivot part. The axial displacement of the pivot pin is prevented by the pin head and the securing element. The distance between the pin head and the securing element defines the position of the pivot parts. After the pivot parts and pivot pin have been joined, the securing element is mounted in a recess in the inner pivot part. In order to mount the securing element, the inner and outer pivot parts must assume a defined position or angle relative to one another. The recess is accessible during the installation process, but later is almost completely covered after installation by the inner pivot part.

In another embodiment, the securing element may be omitted. The axial securing of the pivot pin is accomplished by deforming the inner pivot part into the holding contour of the pivot pin or by a clip element disposed on or integrated with the inner pivot part and engaging the holding contour. The clip element may be elastic. After installation, the pivot pin is axially secured by exerting a force against a deformation section of the inner pivot part to deform that section of the inner pivot part into the holding contour of the pivot pin. This additional installation step may be omitted if the clip element is arranged on an end of a through bore on the inner pivot part that, after mounting, engages in the holding contour in the form of a circumferential groove on the pivot pin. Instead of one or more clip elements, the pivot pin may also be prevented from axially displacing by a local narrowing of the through bore on the end of the inner pivot part or by a corresponding enlargement of the pivot pin diameter. In the interaction between the local narrowing or enlargement with the contour of the corresponding adjacent component, it becomes possible to secure the pivot pin from loss without any additional components.

In another embodiment, the pivotal connection further includes first and second bushings. An end of the pivot pin opposite the pin head is mounted in a blind hole of the outer pivot part. With this configuration, the pivotal connection, in particular the bushings, are shielded from outside environmental influences, on one side by the pin head and on the other side by the blind hole. The first and second bushings are separated by a certain distance, resulting in a stable, play-free and maintenance free pivot mounting. Further, the bushings provide a clean appearance of the derailleur and no further components are needed to seal it off from dirt or for optionally covering the mounting and securing elements.

These and other features and advantages of the invention will be more fully understood from the following description of certain embodiments of the invention, taken together with the accompanying drawings.

BRIEF DESCRIPTION OF THE DRAWINGS

In the drawings:

FIG. 3b is a blow-up of detail A of FIG. 3a;

FIG. 4b is a blow-up of detail B of FIG. 4a.

DETAILED DESCRIPTION

Figure 1:
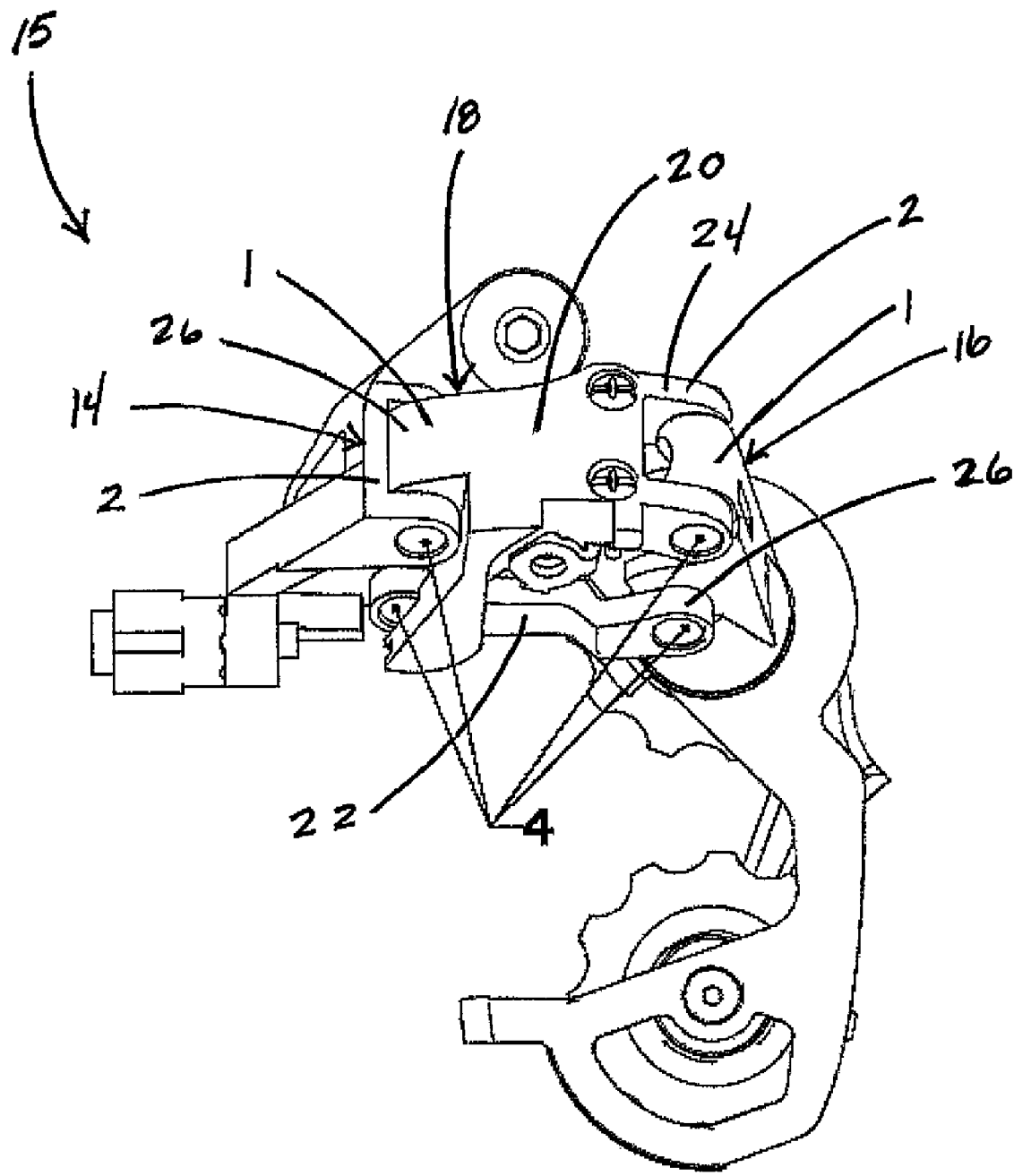
FIG. 1 is a perspective view of a rear derailleur in accordance with one embodiment of the present invention.

FIG. 1 shows a bicycle derailleur 15 according to one embodiment of the present invention. The bicycle derailleur 15 generally includes a base member 14, a parallelogram 18 having two links 20, 22, and a derailleur element or chain cage 16. One end 24 of the parallelogram link 20 connected to the chain cage 16 is embodied as an outer pivot part 2 and the other end 26 of the parallelogram link 20 connected to the base member 14 is embodied as an inner pivot part 1. The inner pivot part 1 is laterally supported by the outer pivot part 2 and pivotally connected to it by pivot pins 4. The pivot pins 4 are axially secured in the covered area of the inner pivot part 1 such that a visible securing element for the pin at the end of the pivot pin is omitted.

Figure 2:
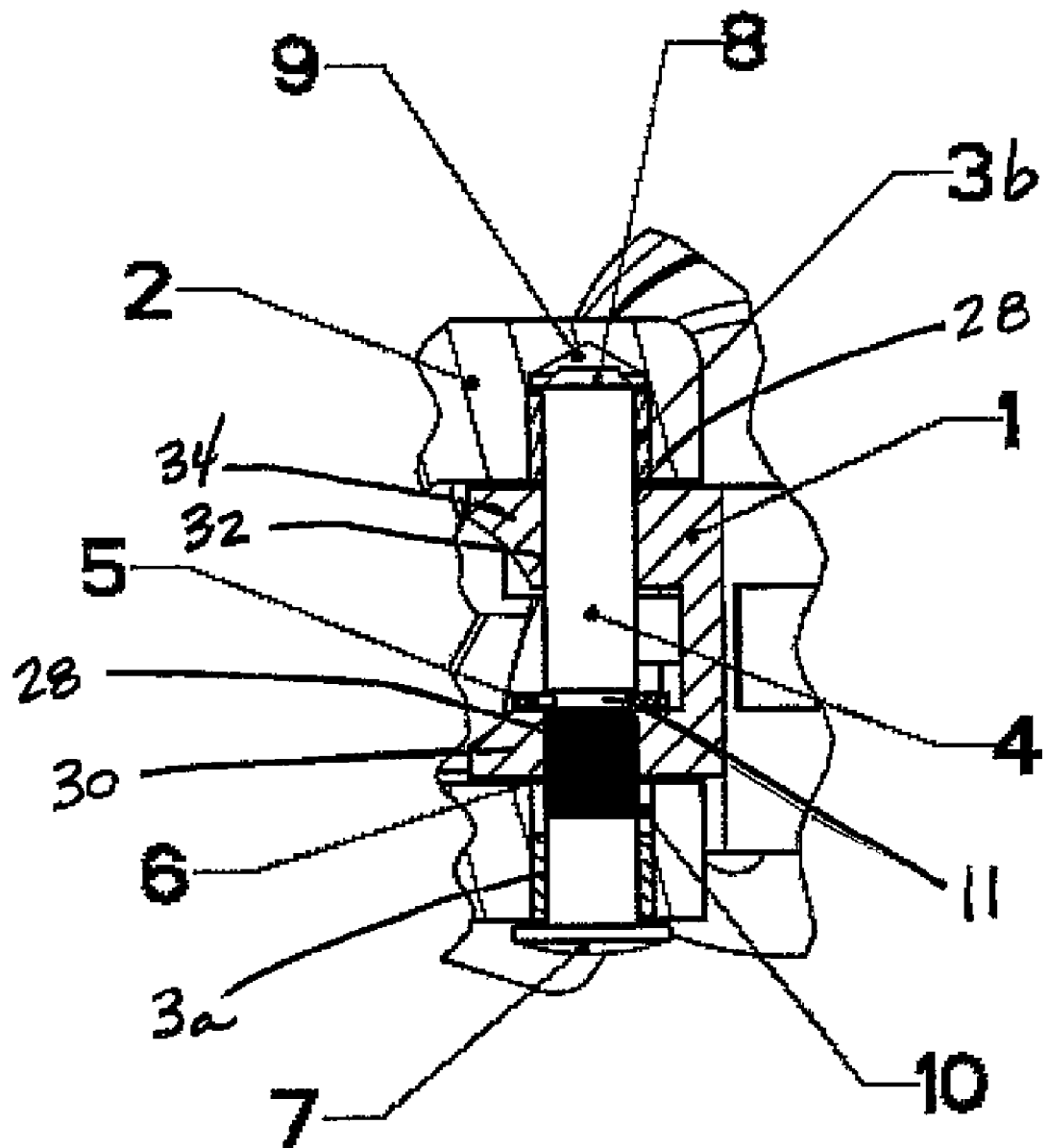
FIG. 2 is a partial cross-sectional view of rear derailleur showing a pivotal connection between inner and outer pivot parts.

Looking to FIG. 2, the pivot pin 4 connects the inner pivot part 1 and the outer pivot part 2. The outer pivot part 2 includes a blind hole 9 and a through hole 10 for receiving the pivot pin 4. The pivotal connection further includes a securing element 5 for preventing axial displacement of the pivot pin 4. A first bushing 3a mounts the pivot pin 4 to the outer pivot part 2. The pivot pin 4 includes an anti-rotation contour 6 and holding contour 11 for engaging with the securing element 5. The securing element 5 may be a securing disc, a securing ring, a snap ring or the like. At one end, the pivot pin 4 has a pin head 7 and at the other end has a chamfer 8. The pivot pin 4 is also mounted to the outer pivot 2 part by a second bushing 3b disposed between the securing element 5 and the pivot head 7. In this embodiment, the anti-rotation contour 6 is a knurl. The securing element 5 prevents the pivot pin 4 from being displaced axially outward and defines the distance to the pin head 7 and thus also the relative position of the inner pivot part 1 to the outer pivot part 2. To connect the inner and outer pivot parts 1, 2 together, the first bushing 3a is pressed into the blind hole 9 and the second bushing 3b is slid over the pivot pin 4 until it is adjacent the pin head 7. The second bushing 3b is able to be slid smoothly over the anti-rotation contour 6 because it is subsequently pressed into the outer pivot part 2 with the pivot pin 4, resulting in the inner diameter of the second bushing 3b being narrowed and a play-free mounting point being formed. The pivot pin 4 is first inserted into the through bore 10 in the outer pivot part 2, then through a hole 28 in a first section 30 of the inner pivot part 1, and finally optionally through the securing element 5. The securing element 5 may be mounted later after the pivot pin 4 has been inserted through a hole 32 in a second section 34 of the inner pivot part 1 and the second bushing 3b, which is supported axially on the pin head 7, has been pressed into the through bore 10 on the outer pivot part 2. After mounting, the pivot pin 4 sits firmly in the inner pivot part 1 due to the anti-rotation contour 6 or a press fit between the pivot pin 4 and the inner pivot part 1 and is inserted in the first bushing 3a in a play-free manner. Because the first and second bushings 3a, 3b are arranged at a maximum distance from one another, a stable pivot connection with defined mounting points is created. Since the pivot connection openings exposed to the outside environment are covered by the blind hole 9, the pin head 7 or the securing element 5, the pivot connection is protected from environmental influences and ensures a clean appearance of the pivot connection or the derailleur.

Figure 3A:
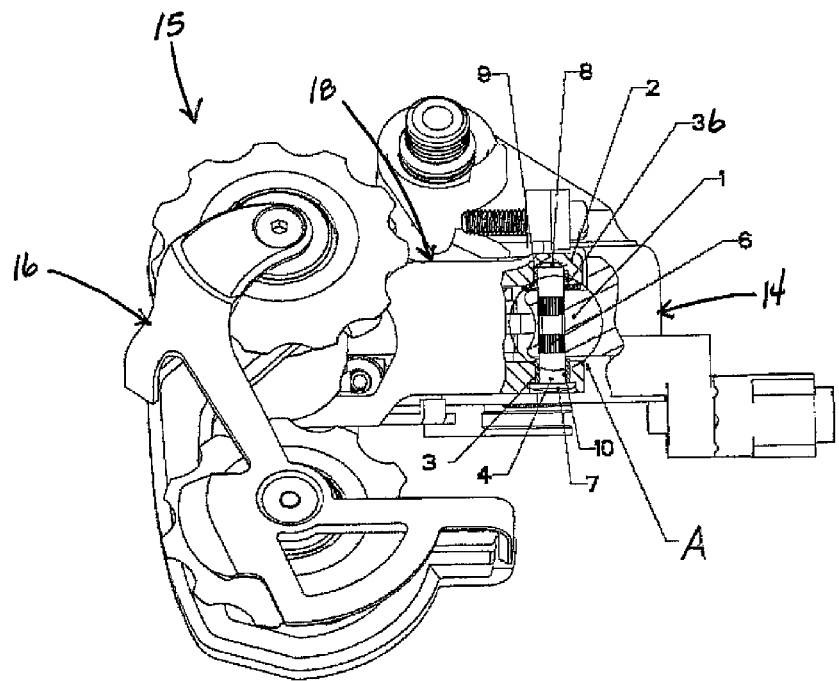
FIG. 3a is a perspective view of the rear derailleur showing a partial cross section of a pivotal connection between the parallelogram mechanism and the base member in accordance with one embodiment of the present invention.
Figure 3B:
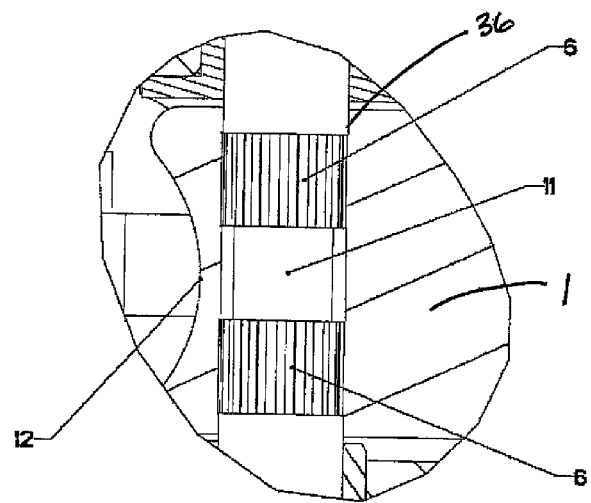

Looking to FIGS. 3a and 3b, the inner pivot part 1 is the base member 14 and the outer pivot part 2 is the parallelogram 18. In this embodiment, the pivot pin 4 includes the pin head 7, the anti-rotation contour 6, and the holding contour 11 between the knurl of the anti-rotation contour 6. One end of the pivot pin 4 has a chamfer 8 for facilitating installation. The arrangement of the bushings 3a, 3b near the ends of the pivot pin 4 results in a stable, defined mounting surface with a maximum mounting distance. Before the inner and outer parts 1, 2 are joined, the first bushing 3a is placed in the blind hole 9 and the second bushing 3b is slid on the pivot pin 4 until it contacts the pin head 7. Damage to the bushing from the passage of the anti-rotation contour 6 is prevented by excess mass of mounting insert bore. After the insertion of the pivot pin 4 into the through bore 10 on the outer pivot part 2, the chamfer 8 facilitates its threading into a bore 36 on the inner pivot part 1 and into the first bushing 3a disposed in the blind hole 9. Further, upon insertion of the pivot pin 4 into the second bushing 3b is supported on the pin head 7 and is pressed into the through bore 10, whereby the size of the inner diameter of the second bushing 3b is set. The anti-rotation contour 6 or the knurl on the pivot pin 4 prevents the pivot pin 4 from rotating in the inner pivot part 1, allowing only a defined movement of the pivot pin 4 in the inner pivot part 1 and therefore allows only a defined movement of the pin 4 in the first and second bushings 3a, 3b, which are positioned far from one another. To prevent axial displacement of pivot pin 4, a deformation section 12 of the inner pivot part 1 is deformed toward the pivot pin 4. In this embodiment, the deformation section 12 is pressed into the holding contour 11 on the pivot pin 4, resulting in a positive connection of the pivot pin 4, securing it against loss. The pin head 7 is countersunk in the outer pivot part 2 and thus covers the first bushing 3a such that this bushing 3a as well as the second bushing 3b arranged in the blind hole 9 are protected and shielded from dirt.

Figure 4A:
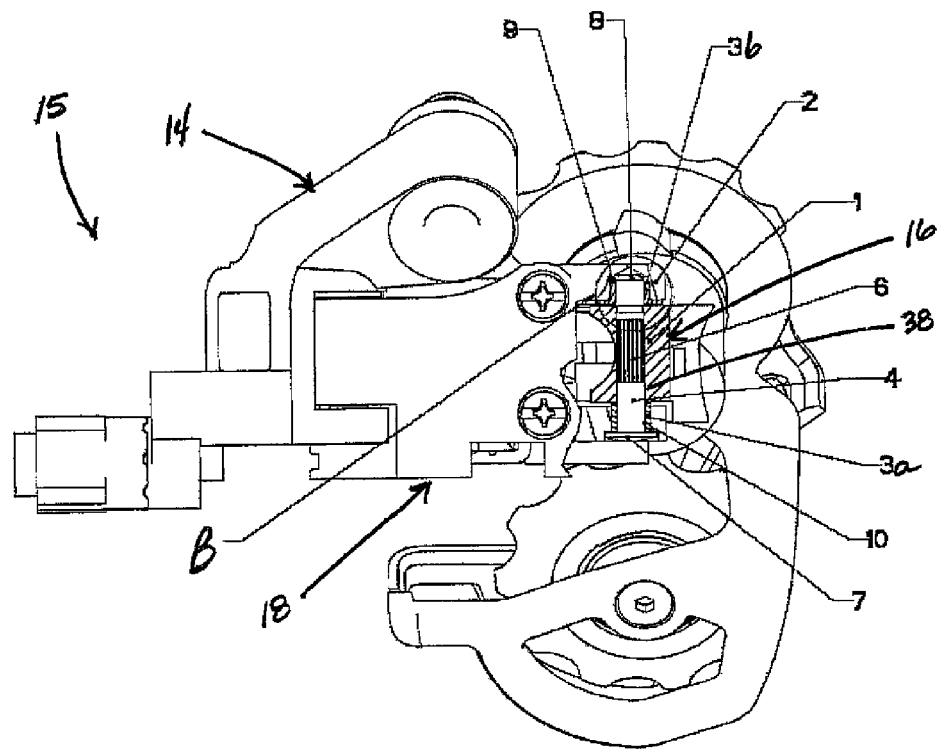
FIG. 4a is a perspective view of the rear derailleur showing a partial cross section of a pivotal connection between the parallelogram mechanism and the chain cage in accordance with one embodiment of the present invention.
Figure 4B:
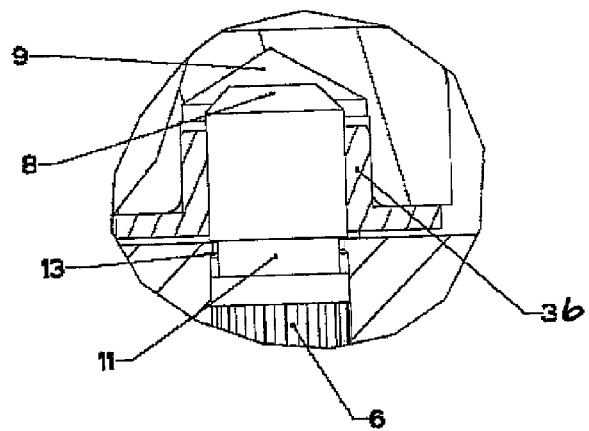

Looking to FIGS. 4a and 4b, the inner pivot part 1 is the chain cage 16 and the outer pivot part 2 is the parallelogram 18. In this embodiment, the pivot pin 4 is axially fixed by a clip element 13 integrated with the inner pivot part 1. The clip element 13 is an inwardly-shaped contour disposed on one side of a bore 38 in the inner pivot part 1. Upon insertion of the pivot pin 4, the clip element 13, supported by the chamfer 8, is pushed outwards and then engages the holding contour 11 on the pivot pin 4. The holding contour 11, in this embodiment a circumferential groove, is disposed in front of the anti-rotation contour 6 in the insertion direction so that the clip element 13 cannot be damaged by the anti-rotation contour 6. In contrast to the embodiment of FIG. 3, the step of deforming the inner pivot part 1 is omitted. The pivotal connection with the first and second bushings 3a, 3b at a maximum distance from one another, which are accepted by the blind hole 9 or by the through bore 10, is covered by the pin head 7 on the side open to the outside.

While this invention has been described by reference to several embodiments, it will be understood that numerous changes could be made within the spirit and scope of the inventive concepts described. Accordingly, it is intended that the invention not be limited to the disclosed embodiments, but that it include the full scope permitted by the language of the following claims.

What is claimed:

1. A pivotal connection between an inner pivot part and an outer pivot part of a bicycle derailleur, the pivotal connection comprising:
   a pivot pin;
   a blind hole disposed in the outer pivot part of the bicycle derailleur; and
   a through hole disposed in the outer pivot part of the bicycle derailleur,
   the pivot pin received in the through hole and the blind hole, the pivot pin having a head covering the through hole, the pivot pin having an anti-rotation contour non-rotatably connected to the inner pivot part, the pivot pin rotatably connected to the outer pivot part of the bicycle derailleur,
   wherein the pivot pin includes first and second ends, the first end having the head and the second end having a chamfer, the anti-rotation contour disposed between the first and second ends, the pivot pin having a holding contour for preventing axial movement of the pivot pin, and wherein the pivot pin is axially fixed by a securing element engaging the holding contour of the pivot pin, the securing element disposed between two sections of the inner pivot part, the distance between the securing element and the pin head determines the two distances between the pivotable outer pivot part and the inner pivot part.

2. The pivotal connection according to claim 1, further comprising first and second bushings disposed near the first and second ends of the pivot pin, respectively, to provide a maximum mounting distance, the first and second bushings rotatably connecting the pivot pin to the outer pivot part.

3. The pivotal connection according to claim 2, wherein the anti-rotation contour is disposed between the pin head and the holding contour, the anti-rotation contour and the holding contour connect the pivot pin and the inner pivot part.

4. The pivotal connection according to claim 2, wherein one of the first and second bushings is inserted into the blind hole and the other of the first and second bushings is pressed into the through hole.

5. The pivotal connection according to claim 4, wherein the one of the first and second bushings is covered by an end of the blind hole and the other one of the first and second bushings is covered by the pin head.

6. The pivotal connection according to claim 1, wherein the securing element is accessible through the inner pivot part during installation and, subsequently, covered when the bicycle derailleur is mounted to a bicycle.

7. A pivotal connection between an inner pivot part and an outer pivot part of a bicycle derailleur, the pivotal connection comprising:

a pivot pin;

a blind hole disposed in the outer pivot part of the bicycle derailleur; and a through hole disposed in the outer pivot part of the bicycle derailleur, the pivot pin received in the through hole and the blind hole, the pivot pin having a head covering the through hole, the pivot pin having an anti-rotation contour non-rotatably connected to the inner pivot part, the pivot pin rotatably connected to the outer pivot part of the bicycle derailleur, wherein the pivot pin includes first and second ends, the first end having the head and the second end having a chamfer, the anti-rotation contour disposed between the first and second ends, the pivot pin having a holding contour for preventing axial movement of the pivot pin; and further comprising an elastic clip element to prevent axial movement of the pivot pin, the elastic clip element connected to the inner pivot part and engaged in the holding contour disposed between the chamfer and the anti-rotation contour of the pivot pin.

8. The pivotal connection according to claim 7, wherein the elastic clip element is integrated with the inner pivot part.

9. The pivotal connection according to claim 7, wherein the elastic clip element and the inner pivot part form one piece.

* * * * *